United States Patent
Chen et al.

(10) Patent No.: US 7,157,524 B2
(45) Date of Patent: Jan. 2, 2007

(54) SURFACTANT-CONTAINING INSULATION BINDER

(75) Inventors: Liang Chen, New Albany, OH (US); Jay W. Hinze, Newark, OH (US); William G. Hager, Westerville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 422 days.

(21) Appl. No.: 09/871,467

(22) Filed: May 31, 2001

(65) Prior Publication Data

US 2002/0188055 A1 Dec. 12, 2002

(51) Int. Cl.
C08F 124/04 (2006.01)
C08F 8/14 (2006.01)
C08K 3/40 (2006.01)

(52) U.S. Cl. .............................. 525/329.5; 525/327.7; 525/330.1; 525/384; 524/249; 524/494

(58) Field of Classification Search .............. 524/494, 524/249, 549, 559, 560; 525/327.7, 329.6, 525/329.8, 340, 329.5, 384
See application file for complete search history.

(56) References Cited

U.S. PATENT DOCUMENTS

| | | | |
|---|---|---|---|
| 4,283,322 A | 8/1981 | Temple | |
| 4,433,020 A | 2/1984 | Narukawa et al. | |
| 4,447,570 A | 5/1984 | Cook et al. | |
| 4,526,914 A | 7/1985 | Dolin | |
| 4,810,576 A | 3/1989 | Gaa et al. | |
| 5,035,936 A * | 7/1991 | Dockrill et al. | 428/96 |
| 5,047,120 A | 9/1991 | Izard et al. | |
| 5,077,361 A | 12/1991 | Hughes et al. | |
| 5,318,990 A | 6/1994 | Strauss | |
| 5,340,868 A | 8/1994 | Strauss et al. | |
| 5,500,315 A | 3/1996 | Calvert et al. | |
| 5,503,767 A | 4/1996 | Schwartz | |
| 5,520,997 A | 5/1996 | Pourahmady et al. | |
| 5,578,371 A | 11/1996 | Taylor et al. | |
| 5,646,207 A * | 7/1997 | Schell | 524/47 |
| 5,661,213 A | 8/1997 | Arkens et al. | |
| 5,663,224 A | 9/1997 | Emmons et al. | |
| 5,670,585 A | 9/1997 | Taylor et al. | |
| 5,718,728 A | 2/1998 | Arkens et al. | |
| 5,763,524 A * | 6/1998 | Arkens et al. | 524/549 |
| 5,824,610 A | 10/1998 | Diehl | |
| 5,840,822 A | 11/1998 | Lee et al. | |
| 5,858,549 A | 1/1999 | Kielbania, Jr. et al. | |
| 5,932,665 A | 8/1999 | DePorter et al. | |
| 5,932,689 A | 8/1999 | Arkens et al. | |
| 5,977,224 A | 11/1999 | Cheung et al. | |
| 5,977,232 A | 11/1999 | Arkens et al. | |
| 5,998,511 A | 12/1999 | Westland et al. | |
| 6,051,646 A | 4/2000 | Nass et al. | |
| 6,071,994 A * | 6/2000 | Hummerich et al. | 524/247 |
| 6,099,773 A * | 8/2000 | Reck et al. | 264/109 |
| 6,114,464 A | 9/2000 | Reck et al. | |
| 6,136,916 A * | 10/2000 | Arkens et al. | 524/556 |
| 6,146,746 A | 11/2000 | Reck et al. | |
| 6,171,654 B1 | 1/2001 | Salsman et al. | |
| 6,184,271 B1 | 2/2001 | Westland et al. | |
| 6,194,512 B1 | 2/2001 | Chen et al. | |
| 6,207,737 B1 | 3/2001 | Schell et al. | |
| 6,207,780 B1 | 3/2001 | Stockhausen et al. | |
| 6,221,973 B1 | 4/2001 | Arkens et al. | |
| 6,241,780 B1 | 6/2001 | Arkens et al. | |
| 6,271,898 B1 | 8/2001 | Clikeman et al. | |
| 6,274,661 B1 * | 8/2001 | Chen et al. | 524/388 |
| 6,299,936 B1 | 10/2001 | Reck et al. | |
| 6,331,350 B1 | 12/2001 | Taylor et al. | |
| 6,348,530 B1 | 2/2002 | Reck et al. | |
| 2002/0091185 A1 * | 7/2002 | Taylor et al. | 524/249 |

FOREIGN PATENT DOCUMENTS

| | | |
|---|---|---|
| DE | 199 49 591 | 4/2001 |
| EP | 583 086 | 2/1994 |
| EP | 0 567 480 | * 11/1994 |
| EP | 0 651 088 | 5/1995 |
| EP | 651 088 | 5/1995 |
| EP | 748 777 | 12/1996 |
| EP | 990 727 | 4/2000 |
| EP | 990 728 | 4/2000 |
| EP | 1018523 | 7/2000 |
| WO | WO 99/02591 | 1/1999 |
| WO | WO 99/09100 | 2/1999 |
| WO | WO 01/10953 | 2/2001 |
| WO | WO 01/96460 | 12/2001 |

OTHER PUBLICATIONS

International Program on Chemical Safety, "Man-Made Mineral Fibers" (EHC77, 1988) pp. 1-6.*

* cited by examiner

Primary Examiner—Tae H. Yoon
(74) Attorney, Agent, or Firm—Inger H. Eckert; Maria C. Casaway

(57) ABSTRACT

A fiberglass insulation binder composition made from a polycarboxy polymer, a polyhydroxy crosslinking agent, and a cationic surfactant, amphoteric surfactant, nonionic surfactant, or mixture thereof. Also, a process for manufacturing a fiberglass insulation product, which involves a step of applying the binder composition onto a fiberglass substrate and curing the fiberglass substrate so treated. Binders produced in accordance with the present invention are characterized by improved atomization, improved binder dispersion and fiber wetting properties, and improved protection of individual fibers during processing.

21 Claims, 3 Drawing Sheets

Fig. 1 ("Prior Art")

SURFACTANT-CONTAINING INSULATION BINDER

TECHNICAL FIELD AND INDUSTRIAL APPLICABILITY OF THE INVENTION

The present invention relates to fiberglass insulation. More specifically, the present invention provides a means for obtaining improved performance of polyacrylic acid and similar fiberglass insulation binders.

BACKGROUND OF THE INVENTION

Polyacrylic acid-based fiberglass insulation binders are typically manufactured with a low molecular weight polyacrylic acid, a polyhydroxy crosslinking agent, and a cure accelerator, such as sodium hypophosphite. Typical embodiments include QRXP-1564 and QRXP-1513, produced by Rohm & Haas. QRXP-1564 is a blend of Acumer 1020 (71.6 wt-%), glycerol (21.8 wt-%), sodium hypophosphite (5.6 wt-%), and a small amount of corrosion inhibitor. Water is added as a diluent. QRXP-1513 is a blend of Acumer 1020, triethanolamine, and sodium hypophosphite. Water is added as a diluent. Acumer 1020 is a polyacrylic acid produced from acrylic acid monomer and a sodium bisulfite reactant. Acumer 1020 has a molecular weight of approximately 2000 and a sulfur content of about 3.4 wt-%. U.S. Pat. Nos. 5,340,868, 5,661,213, and 5,763,524, as well as PCT publications WO 100 699 A2 and WO 9 961 384 A1, disclose conventional sulfur-containing polyacrylic acid-based fiberglass insulation binders. See also U.S. Pat. No. 5,318,990.

Recently, insulation binders, produced by polymerizing acrylic acid monomer in water in the presence of a cure accelerator comprising an alkali metal salt of a phosphorous-containing inorganic acid to form a low molecular weight polyacrylic acid and subsequently reacting the low molecular weight polyacrylic acid with a polyhydroxy crosslinking agent in a crosslinking step in the absence of added catalyst, were described by Chen and Downey in an application entitled "Low Odor Insulation Binder from Phosphite Terminated Polyacrylic Acid" that was filed on Mar. 21, 2001 as Ser. No. 09/814,034.

It has been discovered that when polycarboxy polymer-based binders, such as polyacrylic acid-based binders, are applied to fiberglass in the course of manufacturing insulation products, the binder is not spread on the glass fiber as well as are conventionally employed phenol formaldehyde based insulation binders. This poor interfacing/wetting between glass and the polyacrylic acid binder is believed to result from high surface tension due to the strong hydrogen bond of the acid and the acidity of the binder versus the alkalinity of the glass surface. Such high surface tension binders prevent efficient atomization when the binder is applied by spraying it onto glass fibers e.g. in a forming hood, resulting in undesirable droplet size and binder distribution. Once the binder is on the glass fiber, its acidity and high surface tension result in poor wetting and reduced binder flow to fiber-fiber junctions. The poor wetting and reduced bonding efficiency decreases protection of individual glass fibers and results in increased fiber damage during processing. As a result, product properties, including pack integrity and dusting, are adversely impacted.

A recently issued U.S. Pat. No. 6,171,654 (Seydel Research) discloses the incorporation of ethyoxylated tallow amine surfactants into binder made from terephthalate polymers. The Seydel Research patent does not purport to address the above-noted problems.

SUMMARY OF THE INVENTION

It has now been found that if an appropriate surfactant is added to the polycarboxy polymer binder composition, the surface tension of the polycarboxy polymer binder composition is reduced, enabling a great improvement in binder wetting and in the distribution of the binder into the fiberglass matrix. Thus the present invention provides better fiber protection, less fiber damage, better product performance, and a more environmentally friendly manufacturing operation.

One embodiment of this invention is a fiberglass insulation binder composition comprising a polycarboxy polymer (especially a polyacrylic acid polymer), a polyhydroxy crosslinking agent, and a surfactant selected from the group consisting of cationic surfactants, amphoteric surfactants, nonionic surfactants, and mixtures thereof.

Another embodiment of this invention is a process for producing a fiberglass insulation binder. The process includes the preparation of a mixture of a polycarboxy (e.g., polyacrylic acid) polymer, a polyhydroxy crosslinking agent, a surfactant as described above, and sufficient water to provide a mixture comprising up to 98 wt-% water based on the total weight of solids in the mixture, and blending the mixture to form a polymeric composition useful as a fiberglass insulation binder. In this process, the amount of surfactant employed can ranges from about 0.01 to about 10 weight percent, preferably from about 0.2 to about 5 weight percent, based on the total weight of binder solids. This process can make use of a pre-mixture containing the polymer and crosslinking agent that comprises about 50 to 60 wt-% water. A hydrolyzed silane coupling agent can also be added to the mixture, for example in an amount of from 0.01 to 10 wt-% based upon the weight of the mixture. Likewise, a mineral oil dust suppressing agent to the mixture, for example in an amount of up to 20 wt-% based upon the weight of the mixture. The product of this process is also one aspect of the present invention.

Another important embodiment of the present invention is a process for manufacturing a fiberglass insulation product. This process comprises the step of applying a binder composition as described above onto a fiberglass substrate, and curing the fiberglass substrate so treated. The fiberglass insulation product so produced is yet another embodiment of the present invention.

Advantages of the present invention will become more apparent from the detailed description given hereinafter. However, it should be understood that the detailed description and specific examples, while indicating preferred embodiments of the invention, are given by way of illustration only. Based upon this detailed description, various changes and modifications within the spirit and scope of this invention will become apparent to those skilled in the art.

BRIEF DESCRIPTION OF THE DRAWINGS

The drawings accompanying this application are presented by way of illustration only and are not intended to limit the present invention.

DETAILED DESCRIPTION AND PREFERRED EMBODIMENTS OF THE INVENTION

Figure 1:
FIG. 1 is a Scanning Electron Microscope (SEM) photograph showing poor binder dispersion in a Prior Art context.

As described hereinbelow, compositions of this invention are prepared by polymerization of monomers emulsified in water using conventional emulsion polymerization procedures. Suitable surface-active agents ("surfactants") are used for emulsification of the monomers. Suitable surfactants include cationic, amphoteric, and nonionic surfactants, or mixtures thereof, with nonionic surfactants being preferred. Unless otherwise noted all percentages are weight percent.

The primary solids component of the binder of this invention is preferably acrylic acid, but may be any polycarboxy polymer. Thus the binder of the present invention comprises an organic polymer or oligomer containing a plurality of pendant carboxy groups. The polycarboxy polymer may be a homopolymer or copolymer prepared from unsaturated carboxylic acids including acrylic acid, methacrylic acid, crotonic acid, isocrotonic acid, maleic acid, cinnamic acid, 2-methylmaleic acid, itaconic acid, 2-methylitaconic acid, and the like. Alternatively, the polycarboxy polymer may be prepared from unsaturated anhydrides including maleic anhydride, itaconic anhydride, acrylic anhydride, methacrylic anhydride, and the like, as well as mixtures thereof. Methods for polymerizing these acids and anhydrides are well known in the chemical arts.

The low molecular weight polycarboxy polymer produced in the first step of the process of the present invention is reacted with a polyhydroxy crosslinking agent, such as triethanolamine, glycerol, trimethylolpropane, 1,2,4-butanetriol, ethyleneglycol, 1,3-propanediol, 1,4-butanediol, 1,6-hexanediol, pentaerythritol, sorbitol, and the like. No catalyst is necessary in this crosslinking step.

The polycarboxy polymer, polyhydroxy crosslinking agent and surfactant may be mixed in a conventional mixing device. The polycarboxy polymer may be present at a concentration from about 5% to about 50% by weight, preferably from about 10% to about 30% by weight, based on the total weight of the mixture. It will be readily apparent to those skilled in the art that the concentration ranges for the polycarboxy polymer and other binder components may vary over wide limits and are not sharply critical to the successful practice of the present invention. Water may be added to the solids mixture in any amount which would produce an aqueous binder having a viscosity and flow rate suitable for its application to a forming fibrous glass mat by any convenient method, such as by spraying. Conveniently, water may comprise up to about 98% by weight of the binder.

Examples of useful cationic surfactants include alkylamine salts such as laurylamine acetate, quaternary ammonium salts such as lauryl trimethyl ammonium chloride and alkyl benzyl dimethylammonium chlorides, and polyoxyethylenealkylamines. Examples of the amphoteric surfactants are alkylbetaines such as lauryl-betaine.

Examples of nonionic surfactants which can be used in this invention are polyethers, e.g., ethylene oxide and propylene oxide condensates which include straight and branched chain alkyl and alkaryl polyethylene glycol and polypropylene glycol ethers and thioethers; alkylphenoxypoly(ethyleneoxy)ethanols having alkyl groups containing from about 7 to about 18 carbon atoms and having from about 4 to about 240 ethyleneoxy units, such as heptylphenoxypoly(ethyleneoxy)ethanols, nonylphenoxypoly(ethyleneoxy)ethanols; the polyoxyalkylene derivatives of hexitol including sorbitans, sorbides, mannitans, and mannides; partial long-chain fatty acids esters, such as the polyoxyalkylene derivatives of sorbitan monolaurate, sorbitan monopalmitate, sorbitan monostearate, sorbitan tristearate, sorbitan monooleate, and sorbitan trioleate; the condensates of ethylene oxide with a hydrophobic base, said base being formed by condensing propylene oxide with propylene glycol; sulfur containing condensates, e.g., those prepared by condensing ethylene oxide with higher alkyl mercaptans, such as nonyl, dodecyl, or tetradecyl mercaptan, or with alkylthiophenols wherein the alkyl group contains from about 6 to about 15 carbon atoms; ethylene oxide derivatives of long-chain carboxylic acids, such as lauric, myristic, palmitic, or oleic acids or mixtures of acids, such as tall oil fatty acids; ethylene oxide derivatives of long-chain alcohols such as octyl, decyl, lauryl, or cetyl alcohols; and ethylene oxide/propylene oxide copolymers.

Particularly preferred surfactants include SURFYNOL 420, 440, and 465, which are ethoxylated 2,4,7,9-tetramethyl-5-decyn-4,7-diol surfactants produced by Air Products and Chemicals, Inc. of Allentown, Pa.

The amounts of surfactants employed in the emulsion polymerization process will range from about 0.01 to about 10 weight percent, preferably about 0.2 to about 5 weight percent based on the total weight of monomers and water.

The binders of the present invention may optionally contain conventional adjuvants such as, for example, coupling agents, dyes, oils, fillers, thermal stabilizers, flame retarding agents, lubricants, and the like, in conventional amounts generally not exceeding 20% of the weight of the binder.

The polyacrylic acid and the polyhydroxy crosslinking agent may be mixed with water in a conventional mixing device. Water may be added to the mixture of acrylic acid monomer and polyhydroxy crosslinking agent in any amount which produces an aqueous binder mixture having a viscosity and flow rate suitable for application to a forming fibrous glass mat by any convenient method, e.g., spraying. Water may comprise up to about 98% by weight of the binder mixture.

In use, the polyacrylic acid-based binder produced as described above is applied onto fiberglass, and the fiberglass so treated is cured and formed into, e.g., an insulation blanket. More specifically, the binder is applied to glass fibers as they are being produced and formed into a mat, water is volatilized from the binder, and the resulting high solids binder-coated fibrous glass mat is heated to cure the binder, thereby producing a finished fibrous glass bat. These cured fiberglass bats may be used as thermal or acoustical insulation products, reinforcement for subsequently produced composites, and so on.

It is generally well known in the art to produce a porous mat of fibrous glass by fiberizing molten glass and immediately forming a fibrous glass mat on a moving conveyor. Glass is melted in a tank and supplied to a fiber forming device such as a spinner or a bushing. Fibers of glass are attenuated from the device and are blown generally downwardly within a forming chamber. The glass fibers typically have a diameter from about 2 to about 9 microns and have a length from about ¼ inch to about 3 inches. Preferably, the glass fibers range in diameter from about 3 to about 6 microns, and have a length from about ½ inch to about 1 ½ inches. The glass fibers are deposited onto a perforated, endless forming conveyor. The binder is applied to the glass fibers as they are being formed by means of suitable spray applicators so as to result in a distribution of the binder throughout the formed mat of fibrous glass. The glass fibers, having the uncured resinous binder adhered thereto, are gathered and formed into a mat on the endless conveyor within the forming chamber with the aid of a vacuum drawn through the mat from below the forming conveyor. The residual heat contained in the glass fibers as well as the air flow through the mat causes a majority of the water to volatilize from the mat before it exits the forming chamber.

In more detail, application of the binder may proceed as follows. Melted glass is supplied to a fiber forming device such as a spinner or a bushing. Fibers of glass are attenuated from the device and are blown generally downwardly within a forming chamber. The glass fibers typically have a diameter of about 2 to 9 microns and a length of about ¼ to 3 inches. The glass fibers are deposited onto a foraminous forming conveyor. Binder mixture is applied to the glass fibers as they are being formed, e.g. by means of spray applicators, so as to distribute the binder throughout the formed mat of fibrous glass. The glass fibers, having the uncured resinous binder adhered thereto, are gathered and formed into a mat on the conveyor within the forming chamber with the aid of a vacuum drawn through the mat from below the forming conveyor. The residual heat contained in the glass fibers, as well as air flow through the mat, causes much of the water to volatilize from the mat before it exits the forming chamber.

The mat is then conveyed through a curing oven, typically at a temperature from 200 to 325° C. for from ½ to 3 minutes, wherein heated air is passed through the mat to cure the resin. Fibrous glass having a cured, rigid binder matrix emerges from the oven in the form of a bat, which may be processed and utilized in manners well known to those skilled in the art.

EXAMPLES

The present invention is illustrated by the following non-limiting specific Examples.

Example 1

Surface Tension

A polyacrylic acid based binder having a solids content of 2.8 weight-% was prepared by diluting QRXP 1564 with water, followed by the addition of amino silane and oil emulsion. To make binder products of the present invention, small amounts (0.1 weight-% and 0.2 weight-%) of Surfynol 465 were blended into the binder composition.

Surface tensions of the polyacrylic acid based binder compositions of this invention and of two reference binder compositions were measured using a Surface Tensionmeter 6000, produced by the SensaDyne Instrument Division of the Chem-Dyne Research Group. The instrument was calibrated with deionized water. The data were taken every 5 seconds. After the testing started and the system stabilized, the average value over a one-minute testing period was obtained for each sample. The results are reported in Table 1.

TABLE 1

| Binder Description | Surface Tension (dyne/cm) |
| --- | --- |
| QRXP 1564 2.8% solid | 70.94 |
| QRXP 1564 2.8% + 0.1% S-465 | 62.87 |
| QRXP 1564 2.8% + 0.2% S-465 | 60.54 |
| Phenolic Binder 2.8% | 65.75 |

As can be seen from the reported data, the compositions in accordance with the present invention (QRXP 1564 2.8%+0.1% S-465 and QRXP 1564 2.8%+0.2% S-465) had surface tensions that were lower not only than that of a similar conventional polyacrylic acid binder (QRXP 1564 2.8%) but also than that of a traditional phenol formaldehyde binder.

Example 2

Binding Strength

A polyacrylic acid binder premix was prepared composed on 74.25 parts by weight (pbw) of Acumer 9932 (a 46% solids polyacrylic acid from Rohm & Haas), 10.40 pbw glycerol, 0.45 pbw corrosion inhibitor, and 14.90 pbw water, to provide a 45% solids premix. The premix was added along with silane and oil emulsion to water to provide a 3.5% solids polyacrylic acid glycerol binder (PAG+).

Surfynol 465 surfactant was added to this polyacrylic acid glycerol binder at various % levels based on the binder solids. These binder compositions were sprayed onto fiberglass as in a typical fiberglass insulation binder application to obtain a Loss On Ignition (LOI) of 1.9%. The binder fiberglass was formed into insulation blankets, conveyed to an oven, and cured therein at temperatures ranging from 350 to 590° F. The bond strength, a measure of mechanical strength, of the cured bindered insulation products was measured and is reported in Table 2.

TABLE 2

| Binder Description | Bond Strength (average) |
| --- | --- |
| PAG+ | 3.64 |
| PAG+ with 0.025% S-465 | 3.70 |
| PAG+ with 0.05% S-465 | 3.65 |
| PAG+ with 0.1% S-465 | 3.42 |
| PAG+ with 0.15% S-465 | 3.60 |

This data indicates that the addition of surfactant to polyacrylic acid insulation binders in accordance with the present invention provides acceptable mechanical properties that are generally equivalent to those obtained without surfactant addition.

Example 3

SEM Examination

Figure 2:
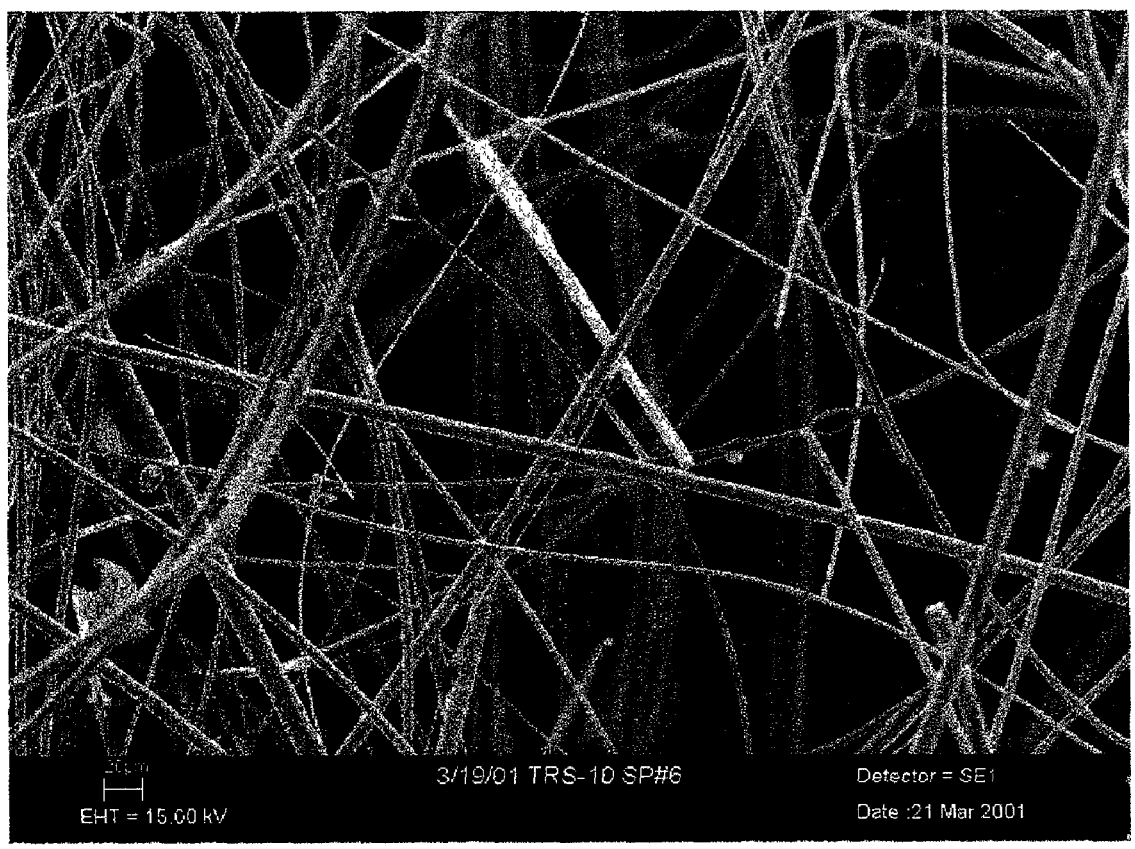
FIGS. 2 and 3 are SEM photographs showing good binder dispersion obtained in accordance with the present invention.
Figure 3:
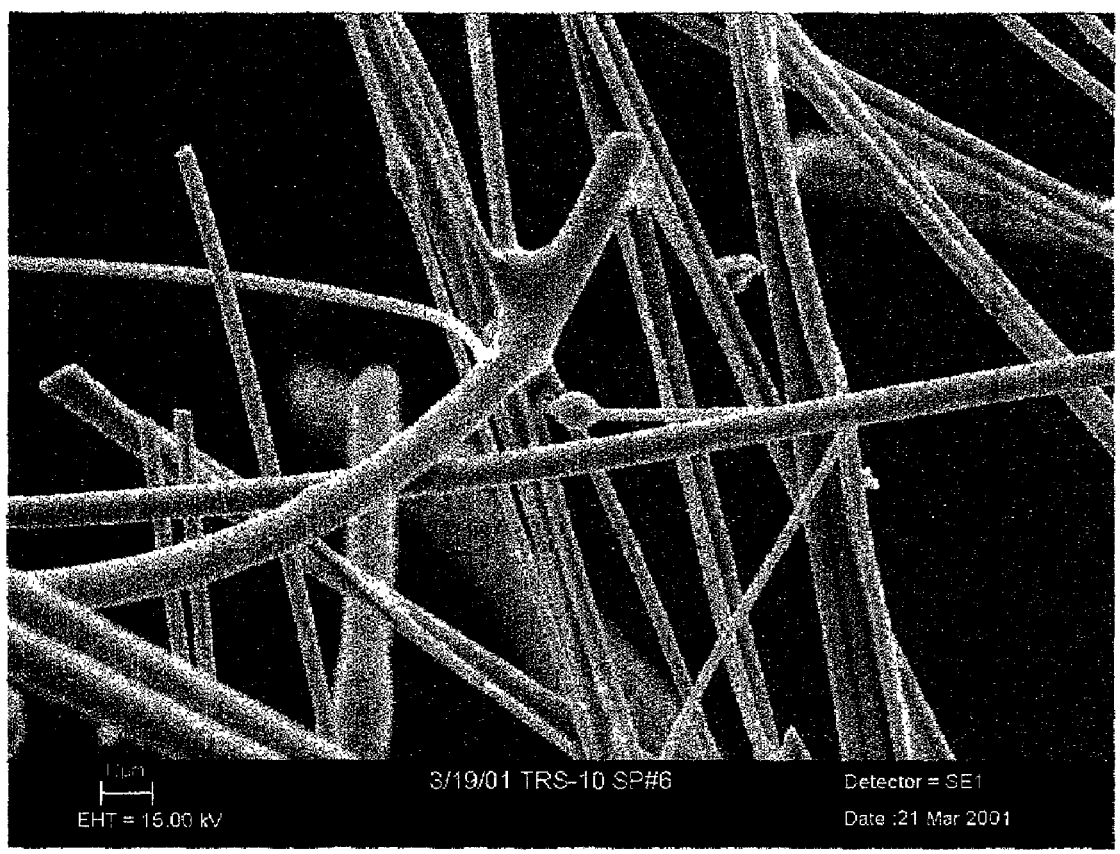

Scanning Electron Microscope imaging reveals structural details relating to the manner in which binder is distributed in a fiberglass matrix. SEM provides insight into such details as droplet size, wetting performance, and fiber-fiber junctions. FIG. 1 shows fiberglass insulation produced with no surfactant added to the polyacrylic acid binder. This sample shows poor binder dispersion and poor atomization. This "prior art" binder is poorly distributed throughout the pack and even forms some binder "nests". FIGS. 2 and 3 show fiberglass insulation produced with surfactant added in accordance with this invention. In these products, the binder was much more uniformly distributed throughout the matrix, the binder showed much better wetting on the glass fiber surface, and more and better fiber-fiber junctions were observed. Thus the present invention significantly improves binder atomization, binder distribution, and binder wetting.

Fiberglass insulation products manufactured in accordance with the present invention have better binder coverage and protection, less glass fiber damage, and provide better working environment and better product performance than do similar products made with previously known polyacrylic acid binder systems.

Example 4

Insulation

The surfactant-activated polyacrylic acid-based aqueous binder of this invention is applied onto fiberglass, and the fiberglass so treated is cured and formed into an insulation blanket. The molten glass is supplied to a rotary fiber forming device-spinner. Fibers of glass are attenuated from the device and are blown generally downwardly within a forming chamber. The surfactant-activated polyacrylic acid-based binder is sprayed through nozzles attached to a binder ring by liquid or air atomization. The binder flow rate and solid content are determined by the product design.

The binder is applied at ambient temperature and most of the water in the binder is volatized as the atomized binder travels through the hot forming air flow and makes contact with the heated glass fiber. The bindered glass fiber blanket is conveyed through a curing oven at a temperature from 200° C. to 350° C. for ½ to 3 minutes. The cured fiber glass blanket can be used as is or can be fabricated to customer demand.

It is understood that the foregoing description and specific embodiments shown herein are merely illustrative of the invention and its principles. Modifications and additions to the invention may readily be made by those skilled in the art without departing from the spirit and scope of the invention, which is therefore understood to be limited only by the scope of the appended claims.

Patent publications cited hereinabove are hereby incorporated by reference in their entirety and for all purposes.

What is claimed is:

1. A fiberglass insulation binder composition comprising:
   a binder pre-mix including a polycarboxy polymer and a polyhydroxy crosslinking agent;
   water in an amount such that said binder composition includes up to 98 wt % water based on the total weight of solids in the binder composition; and
   a surfactant, said surfactant being added to said binder pre-mix in an amount sufficient to control the surface tension of said binder composition to less than the surface tension of an equivalent weight percent solids phenolic binder composition.

2. The fiberglass insulation binder composition of claim 1, wherein the polycarboxy polymer is a polyacrylic acid polymer.

3. A process for producing a fiberglass insulation binder comprising the steps of:
   forming a polycarboxy polymer;
   combining said polycarboxy polymer; a polyhydroxy crosslinking agent, a surfactant, and water to form a mixture, said mixture including up to 98 wt % water based on the total weight of solids in said mixture, and said surfactant being present in said mixture in an amount sufficient to control the surface tension of the binder to less than or about 66 dyne/cm; and blending said mixture to form a polymeric composition useful as a fiberglass insulation binder.

4. The process of claim 3, wherein the amount of surfactant employed ranges from about 0.01 to about 10 weight percent based on the total weight of binder solids.

5. The process of claim 4, wherein the amount of surfactant employed ranges from about 0.2 to about 5 weight percent based on the total weight of binder solids.

6. The process of claim 3, wherein a pre-mixture containing the polymer and crosslinking agent comprises about 50 to 60 wt-% water.

7. The process of claim 3, further comprising the step of adding a hydrolyzed silane coupling agent to the mixture.

8. The process of claim 7, wherein the weight of said hydrolyzed silane coupling agent added to said mixture is from 0.01 to 10 wt-% based upon the weight of the mixture.

9. The process of claim 1, wherein a mineral oil dust suppressing agent is added to said mixture in an amount up to 20 wt % based upon the weight of the mixture.

10. The process of claim 3, wherein the polycarboxy polymer is a polyacrylic acid polymer.

11. A process for manufacturing a fiberglass insulation product comprising the steps of:
    mixing a polycarboxy polymer and a polyhydroxy crosslinking agent to form a binder pre-mix having approximately 50–60 wt % water;
    adding a surfactant to said binder pre-mix to form a fiberglass binder composition, said surfactant being added to said binder pre-mix in an amount sufficient to control the surface tension of said binder composition to less than the surface tension of an equivalent weight percent solids phenolic binder composition;
    applying said binder composition to glass fibers;
    forming said glass fibers into a mat, and
    curing said mat.

12. The process of claim 11, wherein said curing step comprises:
    conveying said mat through an oven at a temperature from about 200° C. to 350° C. for a time period of from about 30 seconds to 3 minutes.

13. The binder composition of claim 1, wherein the surface tension of the binder composition is less than or about 65.75 dyne/cm.

14. The binder composition of claim 13, wherein the surface tension of the binder composition is less than or about 60.54 dyne/cm.

15. The process of claim 3, wherein the surface tension of the binder is less than or about 65.75 dyne/cm.

16. The process of claim 15, wherein the surface tension of the binder is less than or about 60.54 dyne/cm.

17. The process of claim 11, wherein the surface tension of the binder composition is less than or about 65.75 dyne/cm.

18. The process of claim 17, wherein the surface tension of the binder composition is less than or about 60.54 dyne/cm.

19. The fiberglass insulation binder composition of claim 1, wherein said polyhydroxy crosslinking agent is a polyol having two or more hydroxyl groups selected from the group consisting of glycerol, trimethylolpropane, 1,2,4-butanetriol, ethyleneglycol, 1,3-propanediol, 1,4-butanediol, 1,6-hexanediol, pentaerythritol and sorbitol.

20. The process of claim 3, wherein said polyhydroxy crosslinking agent is a polyol having two or more hydroxyl groups selected from the group consisting of glycerol, trimethylolpropane, 1,2,4-butanetriol, ethyleneglycol, 1,3-propanediol, 1,4-butanediol,1,6-hexanediol, pentaerythritol and sorbitol.

21. The process of claim 11, wherein said polyhydroxy crosslinking agent is a polyol having two or more hydroxyl groups selected from the group consisting of glycerol, trimethylolpropane, 1,2,4-butanetriol, ethyleneglycol, 1,3-propanediol, 1,4-butanediol, 1,6-hexanediol, pentaerythritol and sorbitol.

* * * * *

UNITED STATES PATENT AND TRADEMARK OFFICE
Certificate

Patent No. 7,157,524 B2                                                                                       Patented: January 2, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Liang Chen, New Albany, OH (US); Jay W. Hinze, Newark, OH (US); William G. Hager, Westerville, OH (US); Joseph P. Rynd, Tallmadge, OH (US).

Signed and Sealed this Fourth Day of March 2008.

DAVID W. WU
*Supervisory Patent Examiner*
Art Unit 1796

UNITED STATES PATENT AND TRADEMARK OFFICE
CERTIFICATE OF CORRECTION

PATENT NO. : 7,157,524 B2
APPLICATION NO. : 09/871467
DATED : January 2, 2007
INVENTOR(S) : Chen et al.

It is certified that error appears in the above-identified patent and that said Letters Patent is hereby corrected as shown below:

On the title page item [75], insert, Liang Chen, New Albany, OH
Jay W. Hinze, Newark, OH
William G. Hager, Westville, OH
Joseph P. Rynd, Stow, OH Signed and Sealed this Second Day of September, 2008

JON W. DUDAS
*Director of the United States Patent and Trademark Office*